(12) United States Patent
Huang et al.

(10) Patent No.: US 9,772,197 B2
(45) Date of Patent: Sep. 26, 2017

(54) DISPATCH SYSTEM FOR AUTONOMOUS VEHICLES

(71) Applicant: National Taipei University of Technology, Taipei (TW)

(72) Inventors: Shih-Chia Huang, Taipei (TW);
Ming-Kai Jiau, Taipei (TW);
Sheng-Kai Chou, Taipei (TW)

(73) Assignee: National Taipei University of Technology, Taipei (TW)

( * ) Notice: Subject to any disclaimer, the term of this patent is extended or adjusted under 35 U.S.C. 154(b) by 104 days.

(21) Appl. No.: 14/944,231

(22) Filed: Nov. 18, 2015

(65) Prior Publication Data

US 2017/0059336 A1    Mar. 2, 2017

(30) Foreign Application Priority Data

Aug. 31, 2015    (TW) .............................. 104128596 A

(51) Int. Cl.
*G01C 21/34* (2006.01)
*G05D 1/02* (2006.01)
(Continued)

(52) U.S. Cl.
CPC ........... *G01C 21/34* (2013.01); *G05D 1/0297* (2013.01); *G06Q 10/047* (2013.01);
(Continued)

(58) Field of Classification Search
CPC ................. G01C 21/34; G05D 1/0297; G05D 2201/0213; G08G 1/20; G06Q 10/047; G06Q 10/0631; G06Q 50/30
See application file for complete search history.

(56) References Cited

U.S. PATENT DOCUMENTS

2010/0280884 A1    11/2010    Levine et al.
2016/0370194 A1*   12/2016    Colijn .................. G01C 21/343

FOREIGN PATENT DOCUMENTS

CN    101826256    9/2010
CN    103489309    1/2014
(Continued)

OTHER PUBLICATIONS

"Office Action of Taiwan Counterpart Application", dated Nov. 16, 2016, p. 1-p. 6.
(Continued)

*Primary Examiner* — Richard M Camby
(74) *Attorney, Agent, or Firm* — Jianq Chyun IP Office

(57) ABSTRACT

A dispatch system for autonomous vehicle is provided. The dispatch system includes a plurality of autonomous vehicles respectively including a communication unit and a control unit. The communication unit obtains a vehicle location information of itself, and communicates with other autonomous vehicles. The control unit obtains a vehicle available information of itself. One of the autonomous vehicles is selected as a dispatch control center for controlling scheduling of all autonomous vehicles. When the dispatch control center receives a transportation request massage, the dispatch control center performs an optimized scheduling assignment and thus generates a scheduling signal. The scheduling signal is transmitted to the other autonomous vehicles by the communication unit, so as to assign one of the autonomous vehicles as a designated vehicle for transportation.

10 Claims, 7 Drawing Sheets

(51) Int. Cl.
*G06Q 10/04* (2012.01)
*G06Q 10/06* (2012.01)
*G06Q 50/30* (2012.01)
*G08G 1/00* (2006.01)

(52) U.S. Cl.
CPC ......... *G06Q 10/0631* (2013.01); *G06Q 50/30* (2013.01); *G08G 1/20* (2013.01); *G05D 2201/0213* (2013.01)

(56) References Cited

FOREIGN PATENT DOCUMENTS

| | | |
|---|---|---|
| CN | 104859687 | 8/2015 |
| TW | 200506686 | 2/2005 |
| TW | M346082 | 12/2008 |
| TW | 200945272 | 11/2009 |
| TW | I378257 | 12/2012 |
| TW | I476725 | 3/2015 |
| WO | 2015125975 | 8/2015 |

OTHER PUBLICATIONS

"Office Action of Taiwan Counterpart Application," dated Jul. 19, 2016, p. 1-p. 6.

\* cited by examiner

DISPATCH SYSTEM FOR AUTONOMOUS VEHICLES

CROSS-REFERENCE TO RELATED APPLICATION

This application claims the priority benefit of Taiwan application serial no. 104128596, filed on Aug. 31, 2015. The entirety of the above-mentioned patent application is hereby incorporated by reference herein and made a part of this specification.

BACKGROUND OF THE INVENTION

Field of the Invention

The invention relates to a vehicle dispatch system, and particularly relates to a dispatch system for autonomous vehicles.

Description of Related Art

Along with increasing research on intelligent/unmanned vehicles in recent years, researches and techniques of unmanned/autonomous intelligent vehicles are quickly developed. To really drive the autonomous vehicles on the road is no longer unreachable. Under the existing technique, many related techniques, for example, a sensing technique, an object identification technique and a positioning technique have been developed to an extent that basically satisfies the demand of the autonomous vehicles.

In a currently developed dispatch system of the autonomous vehicles, how to integrally schedule the autonomous vehicles at various places, and assign a usage of each of the autonomous vehicles for setting a predetermined driving route of each of the autonomous vehicles have become main problems faced in development of the dispatch system.

SUMMARY OF THE INVENTION

The invention is directed to a dispatch system for autonomous vehicles, by which an independently constructed or dynamically constructed dispatch control center is used to dispatch each of the autonomous vehicles.

The invention provides a dispatch system for autonomous vehicles. The dispatch system includes a plurality of autonomous vehicles and a dispatch control center. The autonomous vehicles are automatically dispatched according to at least one transportation request message, where each of the autonomous vehicles includes a communication unit and a control unit. The communication unit is configured to obtain a vehicle location information of itself, and configured to communicate with other autonomous vehicles. The control unit is coupled to the communication unit, and is configured to obtain a vehicle available information of itself, and controls driving of the autonomous vehicle. One of the autonomous vehicles is selected as the dispatch control center for controlling dispatch of all of the autonomous vehicles. When the dispatch control center receives the transportation request massage, the dispatch control center performs an optimised scheduling assignment according to the transportation request massage, the vehicle location information and the vehicle available information of the autonomous vehicles, and generates a scheduling signal according to the optimised scheduling assignment. The scheduling signal is transmitted to the other autonomous vehicles by the communication unit of the dispatch control center, so as to assign one of the autonomous vehicles as a designated dispatch vehicle for transportation.

According to the above descriptions, the invention provides a dispatch system for autonomous vehicles, which is composed of a plurality of autonomous vehicles and a dispatch control center, where each of the autonomous vehicles may server as the dispatch control center to communicate with the other autonomous vehicles, or the dispatch control center can be independently constructed, so as to implement communication of scheduling assignment and driving route planning. In this way, the dispatch system for the autonomous vehicle may implement scheduling assignment and optimised route planning of a plurality of the autonomous vehicles, so as to decrease the construction cost of the whole vehicle dispatch system. Moreover, since each of the autonomous vehicles of the invention has route planning capability, the invention may also implement functions of planning the driving route according to transport conditions of the passenger/logistics, and performing carpool pairing.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
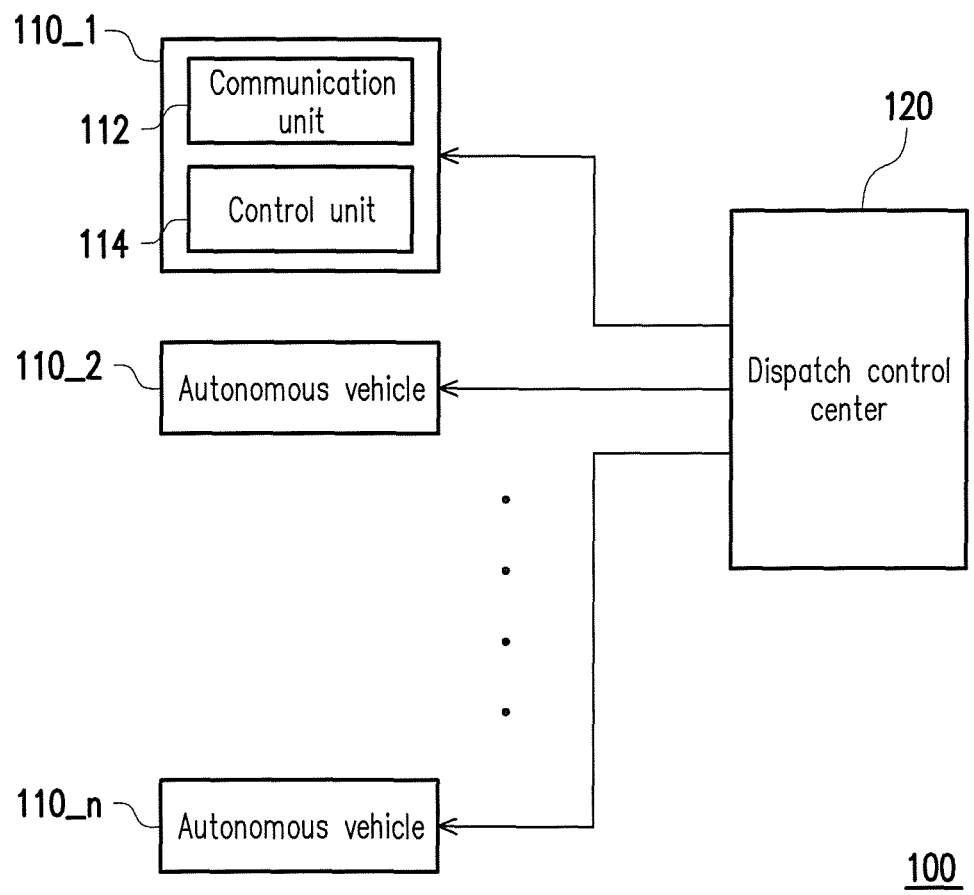
FIG. 1 is a schematic diagram of a dispatch system for autonomous vehicles according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a dispatch system for autonomous vehicles according to an embodiment of the invention. Referring to FIG. 1, the dispatch system 100 of the present embodiment includes a plurality of autonomous vehicles 110_1-110_n (where n is a positive integer greater than 1, which can be determined by a system planner) and a dispatch control center 120.

To be specific, each of the autonomous vehicles 110_1-110_n includes a communication unit 112 and a control unit 114. The communication unit 112 is configured to obtain a vehicle location information of itself, and configured to communicate with other autonomous vehicles 110_2-110_n. In the present embodiment, the communication unit 112 is, for example, a wireless network module, which can communicate with the other autonomous vehicles 110_2-110_n through a wireless network (for example, 3G, 4G, GPRS, etc.), and read a GPS location info nation and a geographic information of itself to serve as the vehicle location information.

The control unit 114 is configured to obtain a vehicle available information of itself, and controls driving of the autonomous vehicle. In the present embodiment, the control unit 114, for example, includes a driving control module, an identity identification module, a payment module, a radar module and a camera module. In other words, the vehicle available information may include information indicating whether the vehicle is in a transportation status and information indicating a current transportation object 10, etc.

The dispatch control center 120 of the present embodiment may control the dispatch of the autonomous vehicles 110_1-110_n according to a transportation request message sent by the transportation object, so as to assign a suitable one of the autonomous vehicles 110_1-110_n for transporting the transportation object to the destination in case of unmanned driver. The transportation object is, for example, a passenger or cargo, which is not limited by the invention.

Figure 2A:
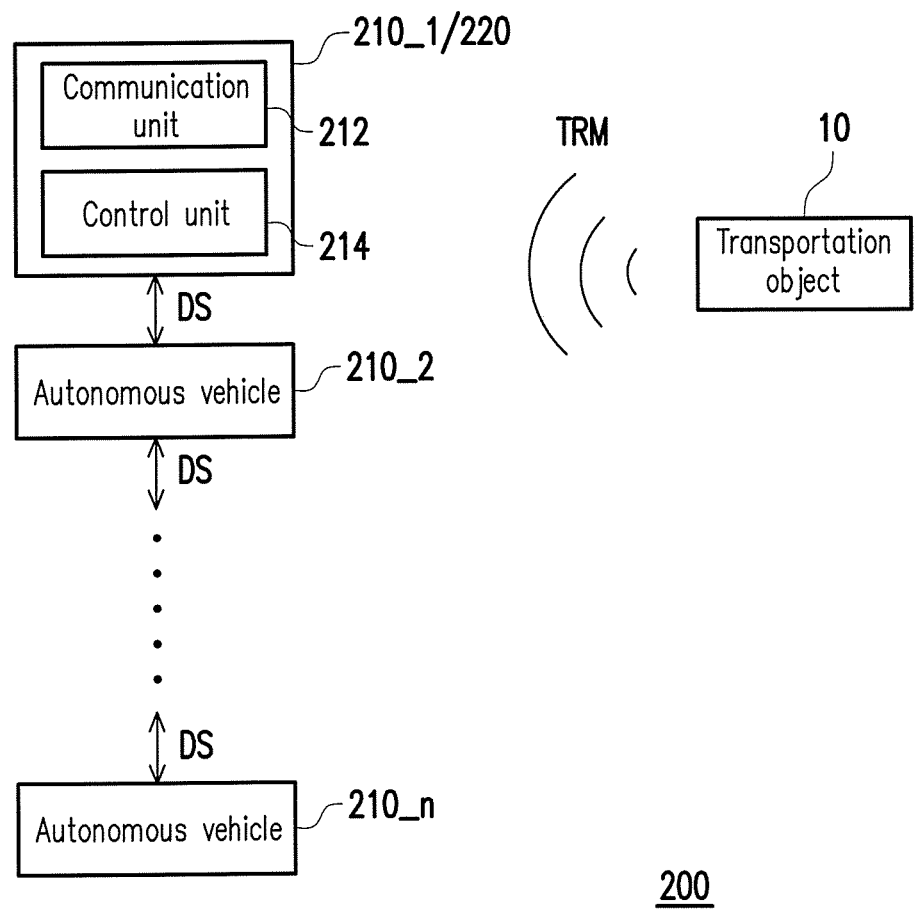
FIG. 2A is a system structural diagram of a dispatch system for autonomous vehicles according to an embodiment of FIG. 1.
Figure 2B:
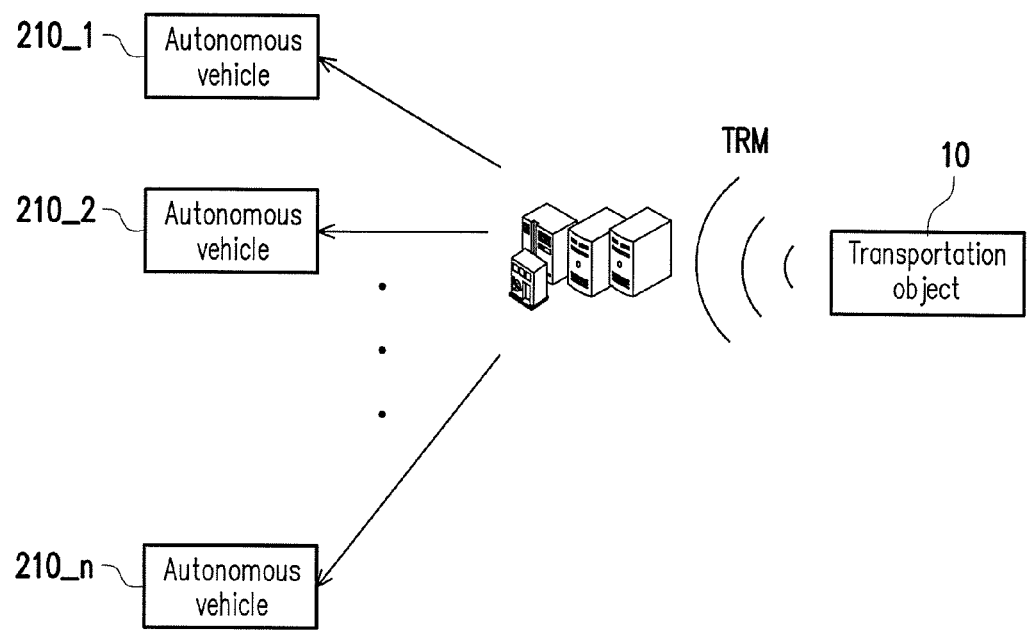
FIG. 2B is a system structural diagram of the dispatch system for autonomous vehicles according to another embodiment of FIG. 1.

FIG. 2A and FIG. 2B are provided below to describe different embodiments of the dispatch system of the invention. FIG. 2A is a system structural diagram of a dispatch system for autonomous vehicles according to an embodiment of FIG. 1. FIG. 2B is a system structural diagram of the dispatch system for autonomous vehicles according to another embodiment of FIG. 1.

Referring to FIG. 2A, in the present embodiment, one of the autonomous vehicles 210_1-210_n is selected as a dispatch control center 220 for controlling dispatch of all of the autonomous vehicles 210_1-210_n (in the present embodiment, the autonomous vehicle 210_1 is selected as the dispatch control center for description, though the invention is not limited thereto). When the autonomous vehicle 210_1 serving as the dispatch control center 220 receives a transportation request massage TRM sent by the transportation object 10, the autonomous vehicle 210_1 serving as the dispatch control center 220 performs an optimised scheduling assignment according to the received transportation request massage TRM, the vehicle location information and the vehicle available information of each of the autonomous vehicles 210_1-210_n, and generates a scheduling signal DS according to the optimised scheduling assignment. The scheduling signal DS is transmitted to the autonomous vehicles 210_1-210_n by the communication unit 212, so as to assign one of the autonomous vehicles 210_1-210_n as a designated dispatch vehicle for transportation.

The aforementioned optimised scheduling assignment is to consider a transportation demand of the transportation object 10, the time and cost for each of the autonomous vehicles 210_1-210_n heading for implementing the transportation and whether each of the autonomous vehicles 210_1-210_n is already in the process of transportation, so as to determine the most suitable one of the autonomous vehicles 210_1-210_n for implementing the transportation service through a comprehensive determination.

In the present embodiment, the transportation request message TRM may include a location information (for example, a start location and an destination location) of the transportation object 10, a time information (for example, a transportation departure time) and other transportation conditions (for example, a route planning method, a road type restriction, etc.) set by the user.

The selection of the dispatch control center 220 of the present embodiment can be predetermined or dynamically determined. For example, in an exemplary embodiment, a system planner may predetermine the autonomous vehicle 110_1 to serve as the dispatch control center. In this case, the dispatch system 100 fixedly uses the control unit 114 of the autonomous vehicle 110_1 to process the dispatch plan and scheduling of all of the autonomous vehicles 110_1-110_n, and sends the corresponding scheduling signal DS through the communication unit 112 of the autonomous vehicle 110_1 to adjust the driving routes of the other autonomous vehicles 110_2-110_n.

In another exemplary embodiment, the autonomous vehicles 110_1-110_n may also dynamically determine whether to serve as the dispatch control center. For example, each of the autonomous vehicles 110_1-110_n may calculate a distance between itself and the transportation object 10 when receiving the transportation request message TRM, such that one of the autonomous vehicles 110_1-110_n that is the closest to the transportation object 10 sets itself as the designated dispatch vehicle and heads for transporting the transportation object 10. Meanwhile, the one of the autonomous vehicles 110_1-110_n serving as the designated dispatch vehicle may transmit the scheduling signal DS to the other autonomous vehicles 110_1-110_n to notify the other autonomous vehicles 110_1-110_n that a vehicle has set forth for implementing the transportation, so as to avoid repeat dispatch. In other words, in the present exemplary embodiment, one of the autonomous vehicles 110_1-110_n that is the closest to the transportation object 10 is selected as the dispatch control center.

Referring to FIG. 2B, the present embodiment is substantially the same to the embodiment of FIG. 2A, and a main difference therebetween is that the dispatch control center 220 of the present embodiment is set up in a manner of an independent station. The dispatch control center 220 may receive the vehicle location information and the vehicle available information of each of the autonomous vehicles 210_1-210_n. Similar to the aforementioned embodiment, when the dispatch control center 120 receives the transportation request message TRM sent by the transportation object 10, the dispatch control center 120 performs the optimised scheduling assignment, and generates the scheduling signal DS for sending to each of the autonomous vehicles 210_1-210_n according to a result of the optimised scheduling assignment. Besides, the method of the optimised scheduling assignment is the same to that of the embodiment of FIG. 2A, which is described in a subsequent embodiment.

Figure 3:
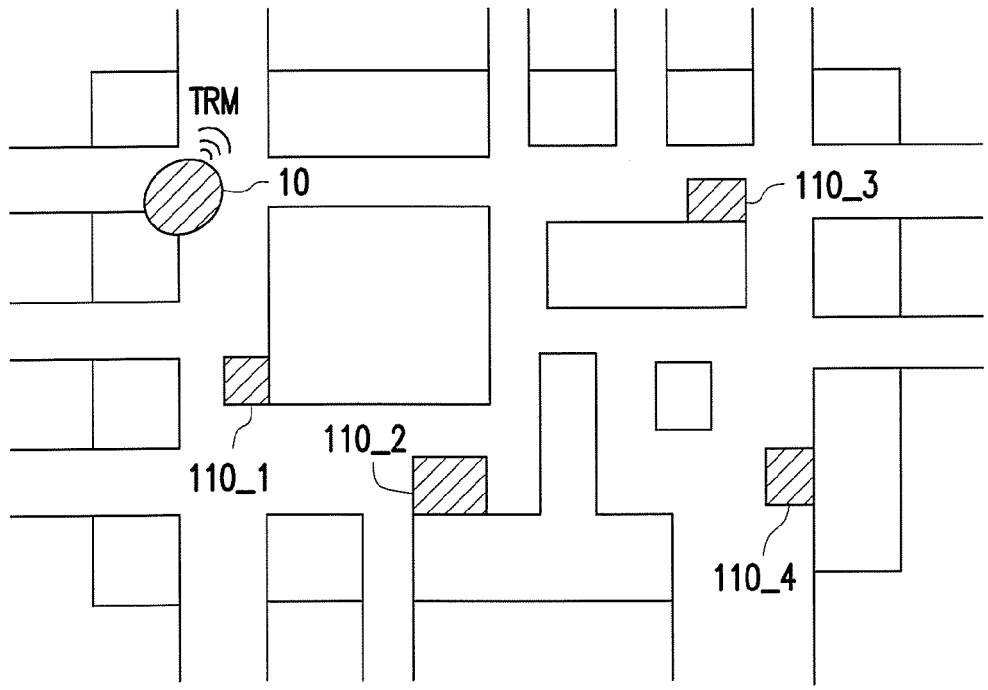
FIG. 3 is an application schematic diagram of a dispatch system for autonomous vehicles according to an embodiment of the invention.

An application situation of the dispatch system 100/200 is shown in FIG. 3. Referring to FIG. 3, the transportation object 10 of the present embodiment is, for example, a passenger, and the autonomous vehicles 110_1-110_4 are unmanned passenger cars.

In the present embodiment, when the passenger 10 sends the transportation request message TRM, each of the autonomous vehicles 110_1-110_4 receives the transportation request message TRM and starts to calculate a distance between itself and the passenger 10.

After the calculation, the autonomous vehicle 110_1 determines that the distance between itself and the passenger 10 is the closest. Therefore, when the autonomous vehicle 110_1 determines that a vehicle available status of itself is an available status, the autonomous vehicle 110_1 is assigned as the designated dispatch vehicle for transporting the passenger 10, and the autonomous vehicle 110_1 sends the scheduling signal DS to notify the other autonomous vehicles 110_2-110_4 that they have no need to go, such that the other autonomous vehicles 110_2-110_4 may stay and wait for transportation request messages sent by other passengers.

On the other hand, if the autonomous vehicle 110_1 determines that the vehicle available status of itself is a non-available status, the autonomous vehicle 110_1 sends the scheduling signal DS to notify the other autonomous vehicles 110_2-110_4, and the autonomous vehicle 110_2 with the secondary closest distance is assigned as the designated dispatch vehicle for transporting the passenger 10.

In the dispatch system 100 of the present embodiment, each of the autonomous vehicles 110_1-110_$n$ may serve as an independent dispatch control center to communicate with the other autonomous vehicles 110_1-110_$n$ to implement scheduling assignment and driving route planning. In other words, the dispatch system 100 of the present embodiment is unnecessary to additionally set up an independent dispatch control center to control the driving route of each of the autonomous vehicles 110_1-110_$n$. In this way, the construction cost of the whole dispatch system 100 is effectively decreased.

Moreover, under the architecture of the dispatch system 100 of the present embodiment, each of the autonomous vehicles 110_1-110_$n$ itself has the route planning capability of the dispatch control center, so that one of the autonomous vehicles 110_1-110_$n$ assigned as the designated dispatch vehicle may plan an optimised driving route according to a start location and an destination location of the transportation object 10 and the route setting conditions. The route setting conditions are, for example, a driving route requirement, a driving time requirement and/or a driving expense requirement set by the passenger, or a cargo delivery time, etc., set by a logistics practitioner.

In the present embodiment, the control unit of the designated dispatch vehicle may select to use a shortest route planning or a fastest route planning to calculate an actual driving route according to the route setting conditions, and accordingly controls the vehicle to drive along the calculated driving route. Embodiments of FIG. 4 to FIG. 7 are provided below to describe a driving route planning method for the autonomous vehicles 110_1-110_$n$.

Figure 4:
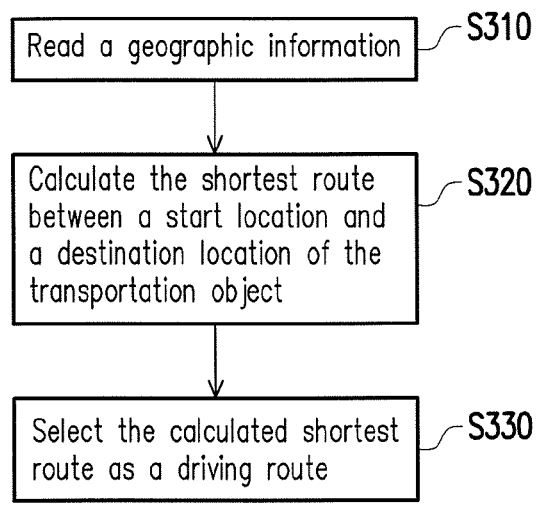
FIG. 4 is a flowchart illustrating a route planning method for autonomous vehicles according to an embodiment of the invention.
Figure 5:
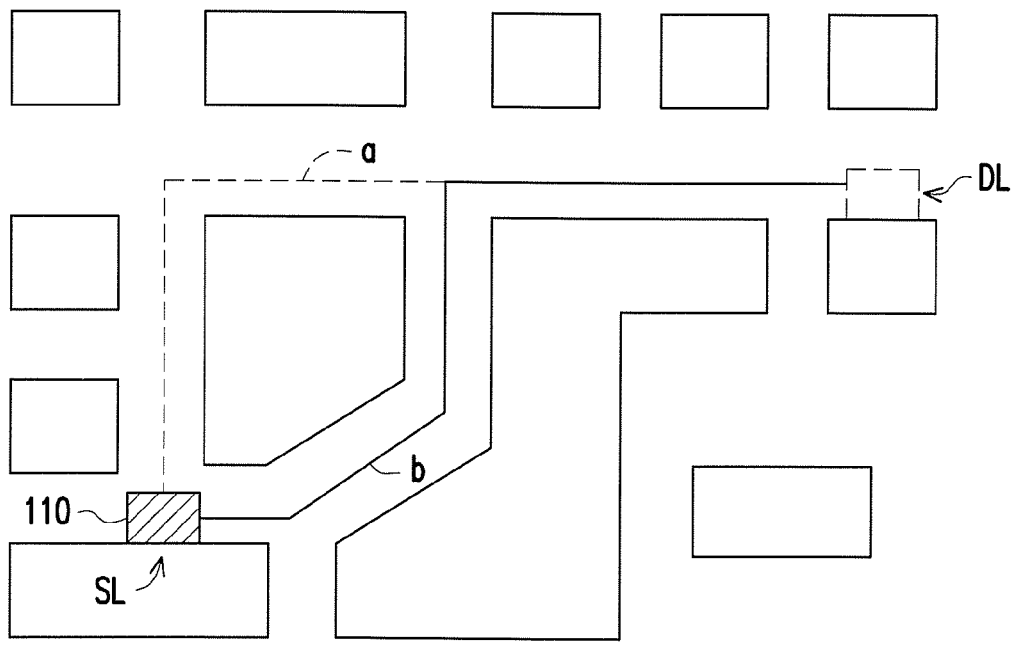
FIG. 5 is an application schematic diagram of the route planning method of FIG. 4.

FIG. 4 is a flowchart illustrating a route planning method for autonomous vehicles according to an embodiment of the invention. FIG. 5 is an application schematic diagram of the route planning method of FIG. 4. In the present embodiment, the driving route is calculated according to the shortest route planning.

Referring to FIG. 4, under the shortest route planning method of the present embodiment, the designated dispatch vehicle reads a geographic information between a start location and an destination location of the transportation object 10 after receiving the transportation request message TRM (step S310), and calculates the shortest route between the start location and the destination location of the transportation object 10 (step S320). After the shortest route is calculated, the designated dispatch vehicle selects the shortest route as the driving route (step S330).

As shown in FIG. 5, after the designated dispatch vehicle 110 reads the geographic information between a start location SL and an destination location DL related to the transportation object, the designated dispatch vehicle 110 determines a route a and a route b between the start location SL and the destination location DL for selection. Under the shortest route planning, the designated dispatch vehicle 110 may select the route b with a shorter distance as the driving route.

Figure 6:
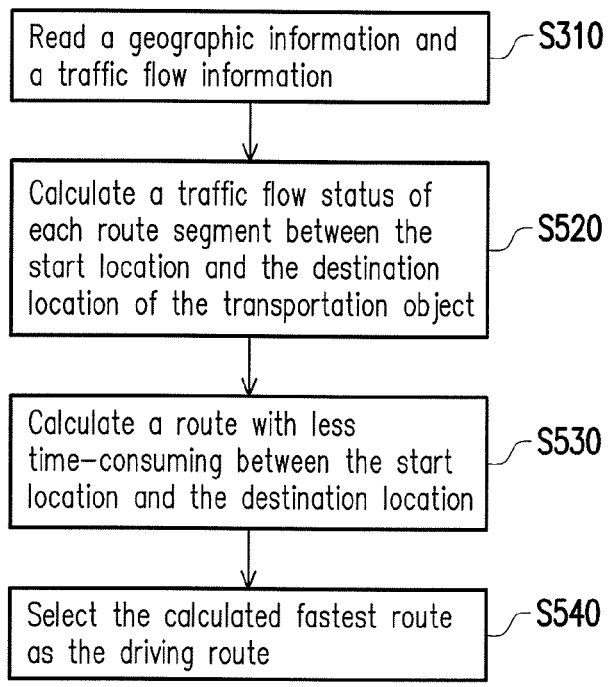
FIG. 6 is a flowchart illustrating a route planning method for autonomous vehicles according to another embodiment of the invention.
Figure 7:
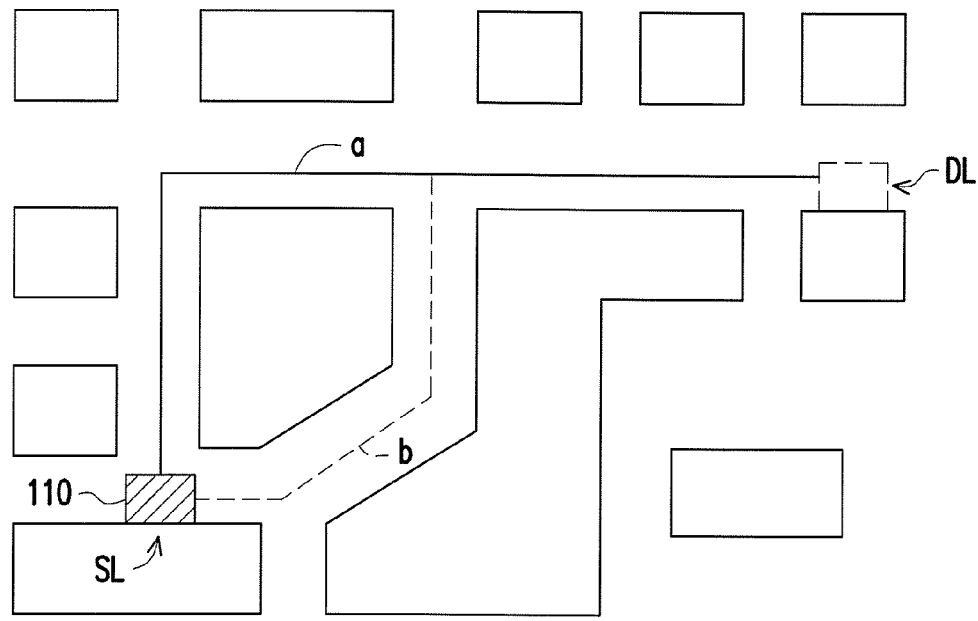
FIG. 7 is an application schematic diagram of the route planning method of FIG. 6.

FIG. 6 is a flowchart illustrating a route planning method for autonomous vehicles according to another embodiment of the invention. FIG. 7 is an application schematic diagram of the route planning method of FIG. 6. In the present embodiment, the driving route is calculated according to the fastest route planning.

Referring to FIG. 6, under the fastest route planning method of the present embodiment, the designated dispatch vehicle reads a geographic information and a traffic flow information between the start location and the destination location of the transportation object 10 after receiving the transportation request message TRM (step S510), and obtains a traffic flow status of each route segment between the start location and the destination location according to the geographic information and the traffic flow information (step S520). After the traffic flow status of each route segment is obtained, the designated dispatch vehicle calculates a route with less time-consuming between the start location and the destination location according to the traffic flow status of each route segment (step S530). Then, the designated dispatch vehicle takes the fastest route as the driving route (step S540).

As shown in FIG. 7, after the designated dispatch vehicle 110 reads the geographic information and the traffic flow information related to the start location SL and the destination location DL of the transportation object, the designated dispatch vehicle 110 determines a route a and a route b between the start location SL and the destination location DL for selection. Then, the designated dispatch vehicle 110 further obtains the traffic flow statuses of the route a and the route b according to the traffic flow information.

It is assumed that although the route b is shorter, there are many traffic lights on the route, and traffic congestion thereof is more severe. In this case, the designated dispatch vehicle 110 determines that it takes longer time to drive through the route b. Therefore, under the fastest route planning, the designated dispatch vehicle 110 selects the route a with longer distance but shorter driving time as the driving route.

Besides the aforementioned shortest route planning and the fastest route planning, the dispatch system 100 of the invention may also adjust the driving route according to a setting condition included in the transportation request message TRM. When the designated dispatch vehicle calculates the driving route, the designated dispatch vehicle first determines whether each route segment set as the driving route is complied with the setting condition in the transportation request message TRM. If a specific route segment in the driving route is not complied with the setting condition, the designated dispatch vehicle calculates a substitution route to replace the route segment that is not complied with the setting condition.

For example, the user may set a setting condition of not to drive on highway. Under such premise, when the designated dispatch vehicle plans the driving route, if the planned route includes a route segment of the highway, the designated dispatch vehicle plans another route without the highway to replace the original driving route, so as to comply with the transportation requirement of the user/transportation object.

Figure 8:
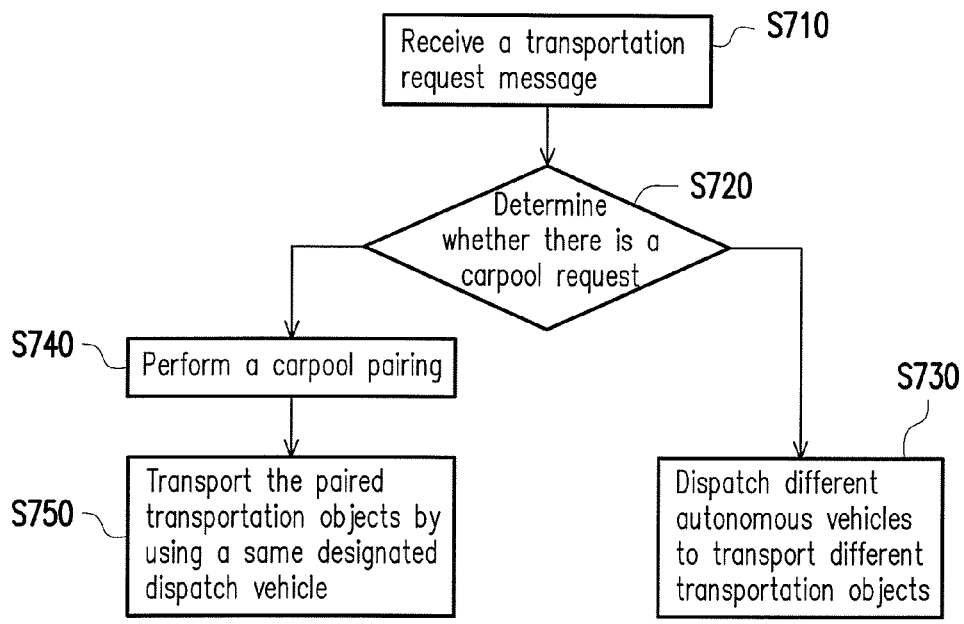
FIG. 8 a flowchart illustrating a dispatch method for autonomous vehicles according to an embodiment of the invention.
Figure 9:
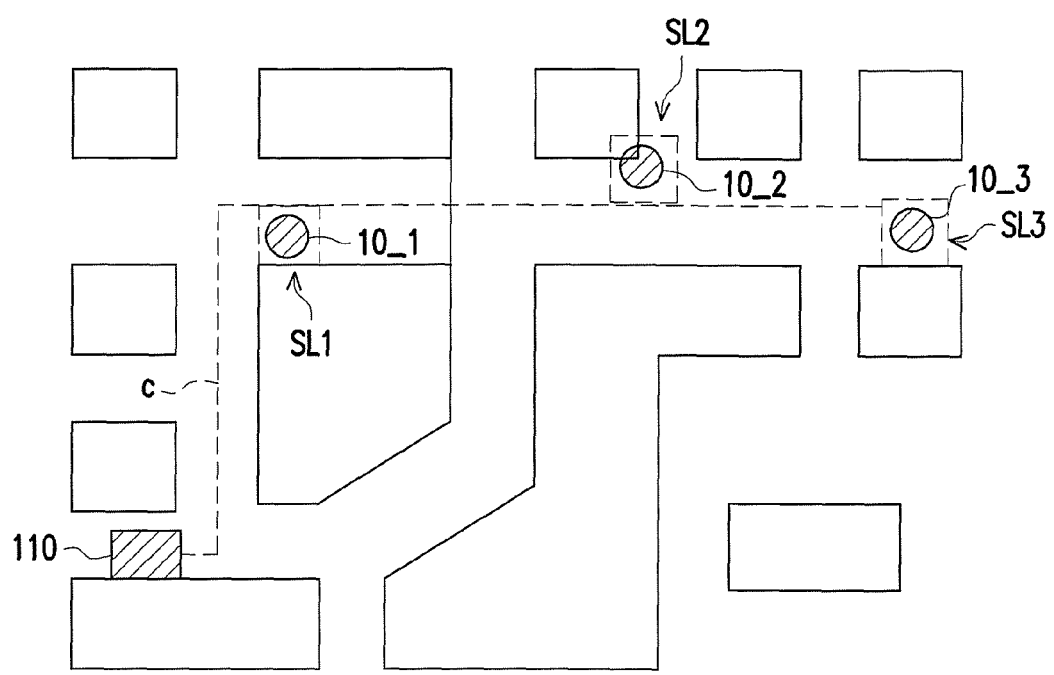
FIG. 9 is a schematic diagram of a carpool route planning for autonomous vehicles according to an embodiment of the invention.

Besides, under the architecture of the dispatch system 100 for the autonomous vehicles, a carpool pairing function and a logistics route planning function of the autonomous vehicles can be further implemented. Embodiments of FIG. 8 and FIG. 9 are provided below for description. FIG. 8 a flowchart illustrating a dispatch method for autonomous vehicles according to an embodiment of the invention. FIG. 9 is a schematic diagram of a carpool route planning for autonomous vehicles according to an embodiment of the invention.

Referring to FIG. 8, first, when the autonomous vehicles receive a plurality of transportation request messages sent by different transportation objects (step S710), the autonomous vehicles first determine whether the transportation objects have a carpool request according to the transportation request messages (step S720). If the determination result is negative, different autonomous vehicles are respectively dispatched to transport the different transportation objects according to the aforementioned scheduling assignment method and route planning method of the embodiments of FIG. 1 to FIG. 7 (step S730). On the other hand, when the autonomous vehicles determine that the transportation objects all have a carpool request, the autonomous vehicles perform carpool pairing according to the transportation request messages (step S740), so as to transport the paired transportation objects by using a same designated dispatch vehicle (step S750).

Regarding the carpool pairing of the step S740 of the present embodiment, the autonomous vehicle basically performs the carpool pairing according to the start locations and the destination locations of the different transportation objects, and determines a pick-up and transportation sequence, such that the transportation objects with close start locations and destination locations can be paired and transported by a same autonomous vehicle, so as to improve a usage efficiency of the autonomous vehicles.

Moreover, in case of the application of transporting passengers, the autonomous vehicle may further perform the carpool pairing according to interpersonal network information of each passenger. To be specific, the autonomous vehicle may calculate a social relevance of each of the passengers according to the interpersonal network information recorded in the transportation request messages, and pairs the passengers according to the social relevance. For example, when the autonomous vehicle performs the carpool pairing, the autonomous vehicle may first read contact information, community website information, etc. of mobile devices of the passengers, so as to determine whether the passengers providing the carpool request have a high social relevance such as to be mutual acquaintance/to have a common friend/to be in a same company/to be in a same college, etc. If some passengers have the high social relevance, theses passengers are paired for riding a same autonomous vehicle. According to such carpool pairing method, the carpooled passengers may have a closer life circle, so as to improve a carpool experience of the passengers. It should be noted that the social relevance of the present embodiment is not limited to the aforementioned range, and under the information range obtained from the interpersonal network information or other passenger information, a passenger age, a passenger sex, a passenger interest, or even a personal record (for example, a criminal record) can all be taken as the social relevance, and the autonomous vehicles can perform the carpool pairing according to the above social relevance, which is not limited by the invention.

In the step S750 of transporting the paired transportation objects, the autonomous vehicle performs overlap comparison on the respective optimised driving routes of the different transportation objects, so as to plan an optimal carpool/transportation route to improve a transportation efficiency of the transportation objects.

As shown in FIG. 9, passengers 10_1-10_3 are assigned as carpool passengers transported by the same designated dispatch vehicle 110, where the start locations of the passengers 10_1-10_3 are respectively SL1-SL3, and the destination location of the passenger 101 is the start location SL3 of the passenger 10_3.

In the present embodiment, the designated dispatch vehicle 110 calculates a route C as the optimised transportation route according to the start locations SL1-SL3 and the destination locations of the passengers 10_1-10_3, such that the designated dispatch vehicle 110 first transports the passenger 10_1, and then transports the passengers 10_2 and 10_3 along the route, and drops off the passenger 10_1 at the start location SL3 of the passenger 10_3.

Moreover, regarding the logistics transportation, the designated dispatch vehicle 110 may further estimate a transportation time according to start locations and destination locations of articles to be transported, and calculates an optimised transportation sequence according to the estimated transportation time, so as to sequentially deliver the articles to be transported to the destinations (i.e., destination locations) according to the optimised transportation sequence. In this way, the articles to be transported can be sequentially delivered within the fastest/specified time.

It should be noted that the step S720 of the embodiment of FIG. 8 is a step to be executed for passenger transportation. Regarding the logistics transportation, the dispatch flow thereof is unnecessary to determine whether there is a carpool request, but directly performs the carpool paring after receiving the transportation request message, so as to optimally plan pick-up and delivering routes of different articles.

In summary, the invention provides a dispatch system for autonomous vehicles, which is composed of a plurality of autonomous vehicles and a dispatch control center, where each of the autonomous vehicles may server as the dispatch control center to communicate with the other autonomous vehicles, or the dispatch control center can be independently constructed, so as to implement communication of scheduling assignment and driving route planning. In this way, the dispatch system for autonomous vehicles of the invention may implement scheduling assignment and optimised route planning of a plurality of the autonomous vehicles under a premise of not to set up an independent dispatch control center, so as to decrease the construction cost of the whole vehicle dispatch system. Moreover, since each of the autonomous vehicles of the invention has route planning capability, the invention may also implement functions of planning the driving route according to transportation conditions of the passenger/logistics, and performing carpool pairing.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A dispatch system for autonomous vehicles, comprising:
   a plurality of autonomous vehicles, automatically dispatched according to at least one transportation request message, wherein each of the autonomous vehicles comprises:
      a communication unit, configured to obtain a vehicle location information of itself, and configured to communicate with other autonomous vehicles; and
      a control unit, coupled to the communication unit, configured to obtain a vehicle available information of itself, and controlling driving of the autonomous vehicle; and
   a dispatch control center, configured to control dispatch of the autonomous vehicles, wherein when the dispatch control center receives the transportation request message, the dispatch control center performs an optimised scheduling assignment according to the transportation request message, the vehicle location information and the vehicle available information of the autonomous vehicles, and generates a scheduling signal for transmitting to the autonomous vehicles according to the optimised scheduling assignment, so as to assign one of the autonomous vehicles as a designated dispatch vehicle for transportation,
   wherein each of the transportation request messages is sent by a transportation object, and each of the transportation request messages comprises a location information and a time information of the transportation object, and when the dispatch control center receives the transportation request messages sent by a plurality of the transportation objects, the dispatch control center performs a carpool pairing according to the transportation request messages, so as to transport the paired transportation objects by using a same designated dispatch vehicle.

2. The dispatch system for the autonomous vehicles as claimed in claim 1, wherein one of the autonomous vehicles is dynamically selected as the dispatch control center.

3. The dispatch system for the autonomous vehicles as claimed in claim 1, wherein the dispatch control center is set up in a manner of an independent station.

4. The dispatch system for the autonomous vehicles as claimed in claim 1, wherein the control unit of the designated dispatch vehicle selects to use one of a shortest route planning and a fastest route planning to calculate a driving route according to a route setting condition, and controls the designated dispatch vehicle to drive along the driving route.

5. The dispatch system for the autonomous vehicles as claimed in claim 4, wherein the location information comprises a start location and a destination location, and when the designated dispatch vehicle selects to use the shortest route planning to calculate the driving route, the control unit of the designated dispatch vehicle reads a geographic information, and selects a shortest route between the start location and the destination location to serve as the driving route according to the geographic information.

6. The dispatch system for the autonomous vehicles as claimed in claim 5, wherein the location information comprises a start location and a destination location, and when the designated dispatch vehicle selects to use the fastest route planning to calculate the driving route, the control unit of the designated dispatch vehicle reads a geographic information and a traffic flow information, obtains a traffic flow status of each route segment between the start location and the destination location according to the geographic information and the traffic flow information, and calculates a route with less time-consuming between the start location and the destination location to serve as the driving route according to the traffic flow status.

7. The dispatch system for the autonomous vehicles as claimed in claim 5, wherein each of the transportation messages further comprises a setting condition, and when the control unit of the designated dispatch vehicle calculates the driving route, the control unit first determines whether each route segment set as the driving route is complied with the setting condition, and when one of the route segments is not complied with the setting condition, the control unit calculates a substitution route to replace the route segment not complied with the setting condition.

8. The dispatch system for the autonomous vehicles as claimed in claim 1, wherein the designated dispatch vehicle calculates an optimised transportation route according to start locations and destination locations of the paired transportation objects.

9. The dispatch system for the autonomous vehicles as claimed in claim 6, wherein each of the transportation request messages further comprises an interpersonal network information of each of the transportation objects, and when the dispatch control center perfon is the carpool pairing, the dispatch control center calculates a social relevance of the transportation objects according to the interpersonal network information of the transportation objects, and pairs the transportation objects according to the social relevance.

10. The dispatch system for the autonomous vehicles as claimed in claim 1, wherein the designated dispatch vehicle estimates a transportation time according to start locations and destination locations of the paired transportation objects, and calculates an optimised transportation sequence according to the transportation time.

* * * * *